United States Patent [19]
Livingston

[11] Patent Number: 6,021,975
[45] Date of Patent: *Feb. 8, 2000

[54] DICHROIC ACTIVE TRACKER

[75] Inventor: Peter M. Livingston, Palos Verdes, Calif.

[73] Assignee: TRW Inc., Redondo Beach, Calif.

[*] Notice: This patent is subject to a terminal disclaimer.

[21] Appl. No.: 08/919,413

[22] Filed: Aug. 27, 1997

[51] Int. Cl.⁷ .............................. F41G 7/00; G01C 21/02; G01B 11/26

[52] U.S. Cl. ..................... 244/3.11; 244/3.13; 250/203.2; 356/141.1

[58] Field of Search ................................ 89/41.06, 41.19, 89/41.21, 1.11; 244/3.11, 3.13; 356/141.1; 250/203.2

[56] References Cited

U.S. PATENT DOCUMENTS

| | | | |
|---|---|---|---|
| 3,427,611 | 2/1969 | Enenstein | 342/54 |
| 3,935,818 | 2/1976 | Johnson et al. | |
| 4,315,689 | 2/1982 | Goda | 356/141.1 |
| 4,349,838 | 9/1982 | Daniel | 358/125 |
| 4,386,848 | 6/1983 | Clendenin et al. | 356/5.01 |
| 4,562,769 | 1/1986 | Heynau et al. | 89/41.06 |
| 4,676,455 | 6/1987 | Diehl et al. | 244/3.13 |
| 5,198,607 | 3/1993 | Livingston et al. | |
| 5,345,304 | 9/1994 | Allen | 356/5.01 |
| 5,528,354 | 6/1996 | Uwira | 356/5.01 |
| 5,600,434 | 2/1997 | Warm et al. | 356/139.08 |
| 5,612,503 | 3/1997 | Sepp | 89/1.11 |
| 5,686,690 | 11/1997 | Lougheed et al. | 89/41.17 |
| 5,747,720 | 5/1998 | Schnurr et al. | 89/1.11 |
| 5,831,724 | 11/1998 | Cordes | 356/141.1 |

OTHER PUBLICATIONS

"Boresighting a Gaussian Beam on a Specular Target Point: A Method Using Conical Scan," Erteza, Ahmed, *Applied Optics*, vol. 15, 1976, pp. 656–660.

"Laser Beam Active Tracking for Specular Objects to Fractions of λ/D" Livingston, Peter, M., Jacoby, Jerold L., and Tierney, William S., *Applied Optics*, vol. 24, 1985 pp. 1919–1925.

Electrotechnology, vol. 84, No. 6, Dec. 1969, p. 171, Laser Target Designator Exhibited at LIA Show.

*Primary Examiner*—Theresa M. Wesson
*Attorney, Agent, or Firm*—Michael S. Yatsko

[57] ABSTRACT

An imaging self-referencing target tracker (10) for a laser weapon (12). The weapon generates a first beam of radiation (14) that engages a target (16) to form a beam hit spot (20) thereon. In a first embodiment, a target illuminator (22) (variant 1) illuminates the target with a second beam of radiation (23a). An optics subsystem (30) receives and separately images the first and second beams (23b, 24) of radiation. In a second embodiment, a blocking filter (40) is implemented rather than an illumination laser to pass only radiation at the target wavelength, thereby ensuring that the first and second beams of radiation are separately imaged. A controller (32) is programmed to steer the first and second beams of radiation to the desired target aim point (18) in response to information from the imaged first and second beams of radiation. The tracker of the present invention tracks the laser hit spot relative to the actual target image in a closed loop manner, thereby increasing the probability of accurate target engagement and resulting in a target kill.

11 Claims, 4 Drawing Sheets

DICHROIC ACTIVE TRACKER

CROSS REFERENCE TO RELATED APPLICATIONS

The present application contains subject matter in common with U.S. patent application Ser. No. 08/919,080, now U.S. Pat. No. 5,918,305 entitled "Self-Referencing Trackers", and U.S. patent application Ser. No. 08/920,538, now U.S. Pat. No. 5,900,620, entitled "Magic Mirror Hot Spot Tracker", both of which are assigned to TRW, Inc., assignee of the present invention.

BACKGROUND OF THE INVENTION

1. Technical Field

The present invention relates generally to systems for tracking moving objects in conjunction with a laser beam and, in particular, to a self-referencing, imaging tracker that separately images target and target laser hit spot radiation to directly reference the laser hit spot relative to the target in a common coordinate system, thereby allowing the laser weapon to be locked onto, and maintained at, a desired target aim point until a target kill is achieved.

2. Discussion

Image trackers are often used in conjunction with lasers or other weaponry to disable inflight missiles. Conventional image trackers presently employ only non-self-referencing schemes for directing a laser beam to a desired target aimpoint. In practice, this means that the laser beam direction in space is inferred from the tracker line of sight as the tracker tracks the missile.

Trackers using imaging, non-self-referencing techniques typically utilize one or more imaging devices, such as electronic cameras, that first determine an approximate, or wide field of view (WFOV) position, and then an instantaneous, or narrow field of view (NFOV), position of a targeted object. After capturing the target image in the NFOV's track gate, the tracker, under servo-loop control, follows the target. In most instances, the tracker is physically mounted on gimbals in a beam pointer. Therefore, the pointer line-of-sight also tracks the target if the pointer and tracker are properly boresighted.

Although conventional imaging, non-self-referencing trackers often provide adequate target location functions, a number of limitations exist with such systems. For example, in medium wave forward looking infrared (FLIR) based trackers, the laser weapon used for target engagement often interferes with the tracker imaging system, as instantaneous non-specular return from the laser hit spot on the object often blinds the camEra, or, at least causes the camera automatic gain control to reduce camera gain to accommodate the bright laser hit spot, thereby losing all target image information. Typically, the laser-reflected power is some 40 to 60 dB greater than the target thermal signature. Additionally, with regard to long wave FLIR based systems, bright thermal energy from heated war heads may also blind such systems, causing the systems to lose track of the targeted object.

Solutions to the above problems include programming the system to select a laser aim point outside of the narrow field of view (NFOV) or the use of short wave infrared (SWIR) track bands with active illumination, causing the laser return to be invisible to the NFOV SWIR camera. If the laser aim point is selected outside of the view of NFOV however, the laser beam pointing must be determined by feed forward estimation. Such an end point selection is undesirable, as it eliminates missile nose-kill possibilities, and is subject to estimation noise as explained earlier. Alternatively, if a short range IR track band is used, the laser beam pointing must also be done via feed forward estimation. Such a scheme increases the susceptibility of the tracker to atmospheric disturbances.

Additionally, with non-self-referencing imaging trackers, the tracker line-of-sight must be accurately boresighted with the laser weapon line of sight. Due to the design of such systems, it has been found difficult to maintain an accurate bore sight under adverse environmental conditions.

Self-referencing trackers solve the above described limitations of the conventional imaging, non-self-referencing trackers by referencing the laser beam instantaneous position to the target image itself rather than to the tracker line-of-sight direction. Also, self-referencing trackers have lines-of-sight that need not be coaxial with the laser weapon, thereby subsequently minimizing the weight on the system gimbals and simplifying system transmit optics.

Presently, non-imaging self-referencing trackers, such as the systems disclosed in U.S. patent application Ser. No. 08/631,645, now U.S. Pat. No. 5,780,838, entitled "Laser Crossbody Tracking System and Method", and U.S. patent application Ser. No. 08/760,434, now U.S. Pat. No. 5,780,839, entitled "Laser Crossbody and Feature Curvature Tracker", both incorporated herein by reference, are known in the art.

Non-imaging self-referencing trackers are presently deployed as vernier trackers; that is, the trackers correct residual image jitter created by imperfect image tracker performance. Thus, the non-imaging tracker bears the major tracking burden for difficult targets, such as small artillery rounds or maneuvering cruise missiles. Non-imaging self-referencing trackers use the laser beam itself to seek and hold onto a glint, such as a cylindrical missile roll axis. Therefore, the laser beam positioning on the target becomes independent of tracker jitter in the jitter direction and within the non-imaging tracker track bandwidth.

Although non-imaging self-referencing systems provide certain advantages over imaging, non-self-referencing systems, there is still room for improvement in the art. For example, there is a need for an imaging, self-referencing laser beam tracker that can be locked onto a desired target aim point, whether or not a glint is present at that point, and held on the aim point at will. In addition, there is a need for an imaging, self-referencing tracker that provides maximum noise immunity from atmospheric optical turbulence through measurement of the laser beam position relative to the position of the target through the same atmospheric path. There is also a need for an imaging, self-referencing tracker that reduces or eliminates the pointing error associated with the estimated aimpoint offset associated with conventional open loop trackers by measuring an actual laser hit spot location on the target relative to the target itself.

SUMMARY OF THE INVENTION

Accordingly, the tracker of the present invention provides target aim point selection and calculation of the track-point offset via a high power laser beam closed loop tracking system. There are two variants of the present invention; In variant 1, a pulsed near-infrared band illuminator laser, mounted near the tracker, illuminates the missile body, enhancing its image, as received by the tracker. In the tracker are two detector arrays; one sensitive to the near-IR radiation associated with the illuminator, but insensitive to the mid-IR radiation associated with the laser, and a second array sensitive to the mid-IR band but not the near-IR band in which the target image is determined. In the second variant, the mid-IR band is divided into two sub-bands; one containing all the laser lines, and one extending to the band limit determined by atmospheric absorption. Typically the bands are; (a) laser: 3–4 μm; (b) target image; 4–4.5 μm. These sub-bands are created by a blocking filter that is placed in the target image optical path. The image and laser hit spot from either variant are co-registered by optics choice and physical constraints placed on the detector arrays, then target and hit-spot centroid information refer to a common coordinate system from which the laser hit centroid vector distance to the image centroid is readily determined. The desired laser aimpoint may also be transcribed into that same coordinate system, therefore a servo-loop arrangement sensitive to the vector difference between the laser hit-spot and the laser aimpoint activates, driving the laser hit spot to the assigned laser aimpoint.

More particularly, variant 1 of the present invention provides a target tracker that includes a target illuminator that illuminates the target with radiation of a first wavelength. A laser weapon generates a laser beam comprised of radia ion having a second wavelength. The laser beam engages the target and forms a laser beam hit spot thereon. An optics subsystem receives and detects both the illuminated target and the hit spot. A controller is programmed to steer the laser beam in response to the detected target and hit spot locations.

Variant 2 of the present invention provides a target tracker that includes an optics subsystem that separately images target radiation and laser hit spot radiation. A blocking filter incorporated into the optics subsystem ensures that only radiation at the target radiation wavelength passes to the first detector, while only radiation at the target hit spot wavelength passes to a second detector. The blocking filter obviates the need for the target illuminator utilized in variant 1. A controller then steers the laser beam generated by the laser weapon in response to the detected target and target hit spot locations.

In addition, the present invention provides a method of tracking a target. The method includes the steps of selecting an aim point on a target; illuminating the target with radiation having a first wavelength; engaging the target with a laser beam of a second wavelength to form a laser beam hit spot on the target; simultaneously imaging the illuminated target and the laser beam hit spot; and steering the laser beam to a target aim point based on a calculated difference between the target aim point and the laser beam hit spot.

DETAILED DESCRIPTION OF THE PREFERRED EMBODIMENTS

Figure 1A:
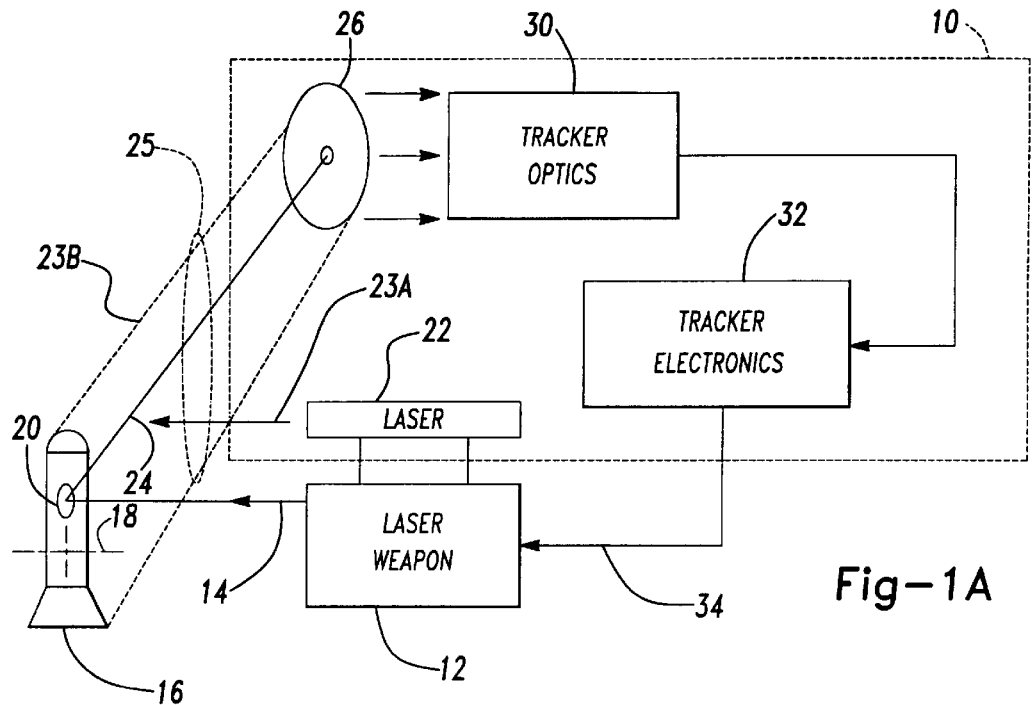
FIG. 1A is a block diagram illustrating the tracker according to a preferred embodiment of the present invention.

Referring to FIG. 1A, a missile tracker according to a first preferred embodiment of the present invention is shown generally at 10. The tracker is implemented in conjunction with a laser weapon 12 to steer a laser beam 14, produced by the laser weapon, into engagement with a target, such as the missile shown at 16. The tracker functions first to lock the target in its field-of-view, then to drive the difference between the desired target aim point, indicated by the cross hairs at 18, and an actual laser beam target engagement point, referred to as the laser beam hit spot 20, to zero, thereby increasing the probability of a target kill.

As will now be described, the tracker of the present invention images both the missile 16 and the laser beam hit spot 20 in a manner that minimizes loss of missile information using one of two possible implementations which will be referenced throughout as variant 1 and variant 2. In variant 1, eLs shown in FIG. 1A, the system includes an illuminator laser 22 that preferably operates in the near infrared band. The laser 22 illuminates the missile 16 with a series of short pulses of light 23a. The illuminator laser 22 creates an enhanced image of the missile 16 contained in the reflected radiation 23a, that includes minimal background interference because of its short pulse length image gating. The reflected radiation 23b, in combination with radiation 24 reflected from the target hit spot 20, form an input beam of radiation, indicated generally at 25.

Still referring to FIG. 1A, the input radiation 25 is incident upon receiver optics 26. The radiation from the missile contained in the incident radiation may be, for example, 1.54 microns, while the radiation from the laser may be, for example, 3.80 microns. However, these wavelengths are arbitrary as long as the tracker imagers, discussed below, image only radiation from specific predetermined wavelengths. The radiation 25 passes to tracker optics 30, which separates the radiation from the missile 16 and from the laser beam hit spot 20 in a manner that is described in more detail below. The tracker optics 30 generate an electrical output that is fed into tracker electronics 32. Tracker electronics, enabled only during the pulsing of the laser, process the signal information from the tracker optics 30 and correspondingly output beam steering commands 34 to the laser weapon 12.

Figure 2A:
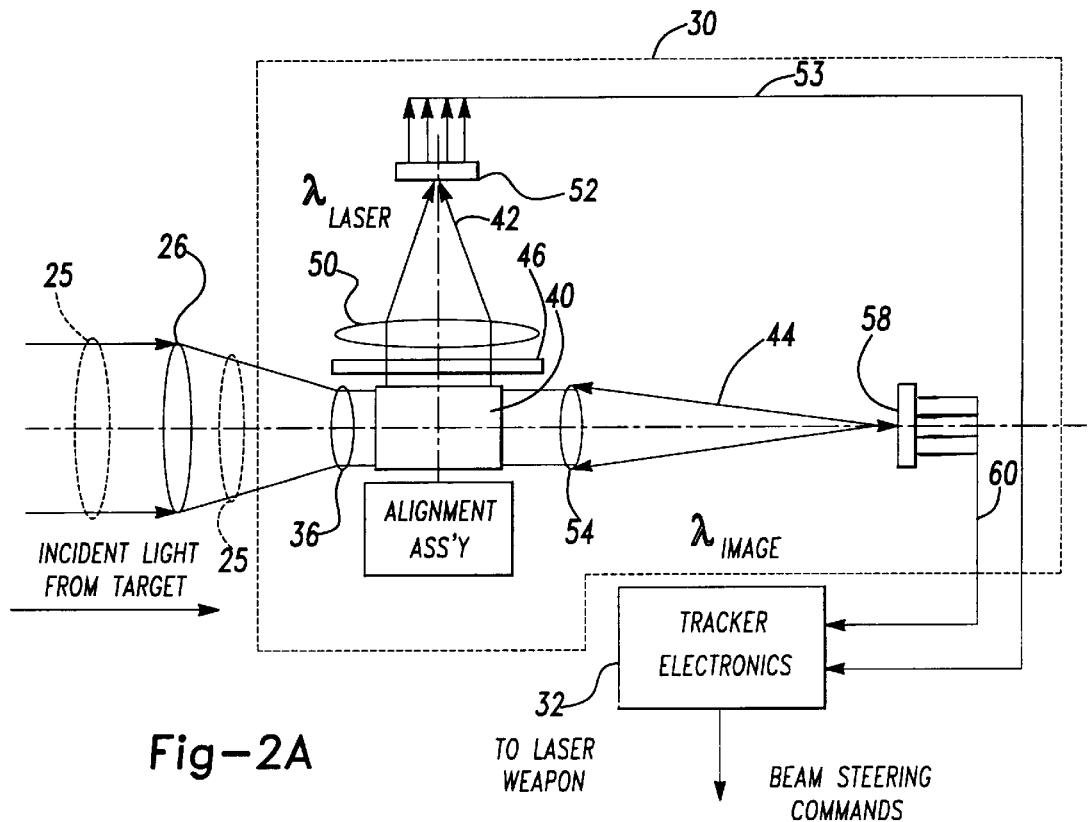
FIG. 2A illustrates the components of the optical subsystem of the first preferred embodiment shown in FIG. 1A in more detail.

FIG. 2A illustrates the tracker optics 30 in greater detail. The input radiation 25 is focused through input optics onto a recollimating lens 36. The recollimating lens 36 passes the collimated input beam onto a dichroic beam splitter 40. The dichroic beam splitter 40 splits the collimated input beam of radiation 25 into a first beam of radiation 42 and a second beam of radiation 44. The first beam of radiation is passed through a band pass filter 46 that permits radiation only at the wavelength of the laser beam 14 to pass. The filtered radiation then passes through a detector imaging lens 50 that focuses the radiation onto a focal plane detector array 52. Preferably, the focal plane detector array 52 is a charge coupled device (CCD) array of detectors, with each detector in the array being proportionally sensitive to all radiation incident thereon. The detector array 52 preferably includes an associated gain that is adjusted according to the level of the first beam of radiation.

Still referring to FIG. 2A, the second beam of radiation 44 is output from the beam splitter 40 through secondary focusing lens 54. The secondary focusing lens 54 focuses the beam onto a second detector array 58, which is of a type similar to the array 52. The array 58 outputs electrical signals 60 corresponding to the signal level of the beam of all radiation 44 incident thereon.

Figure 1B:
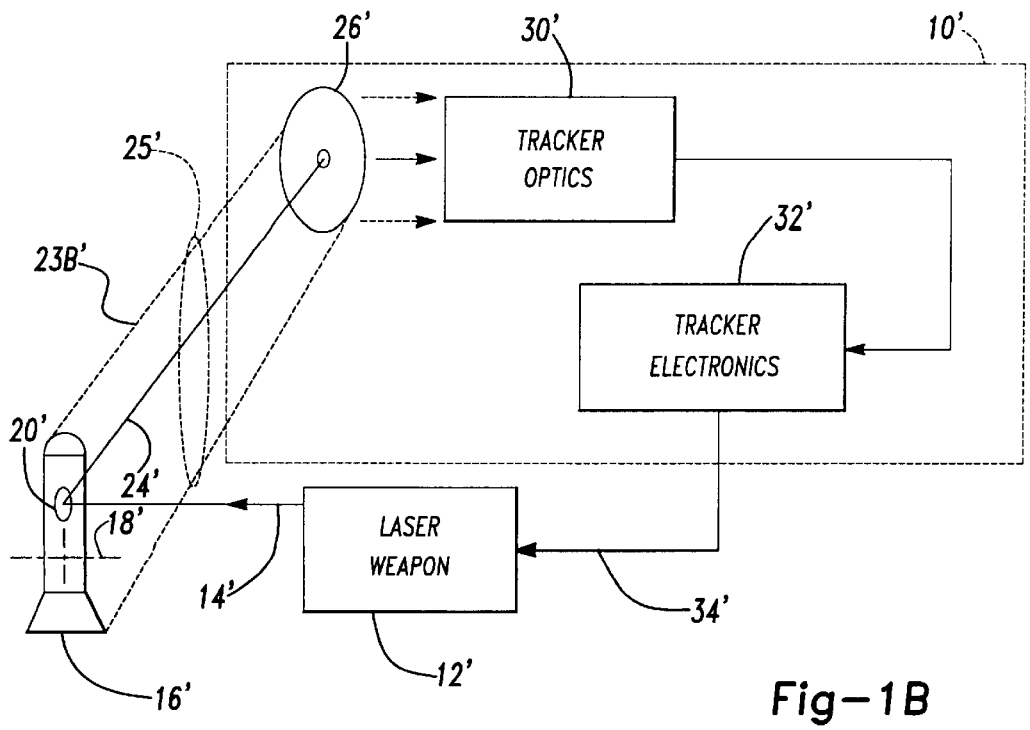
FIG. 1B is a block diagram illustrating the tracker according to a second preferred embodiment of the present invention.
Figure 2B:
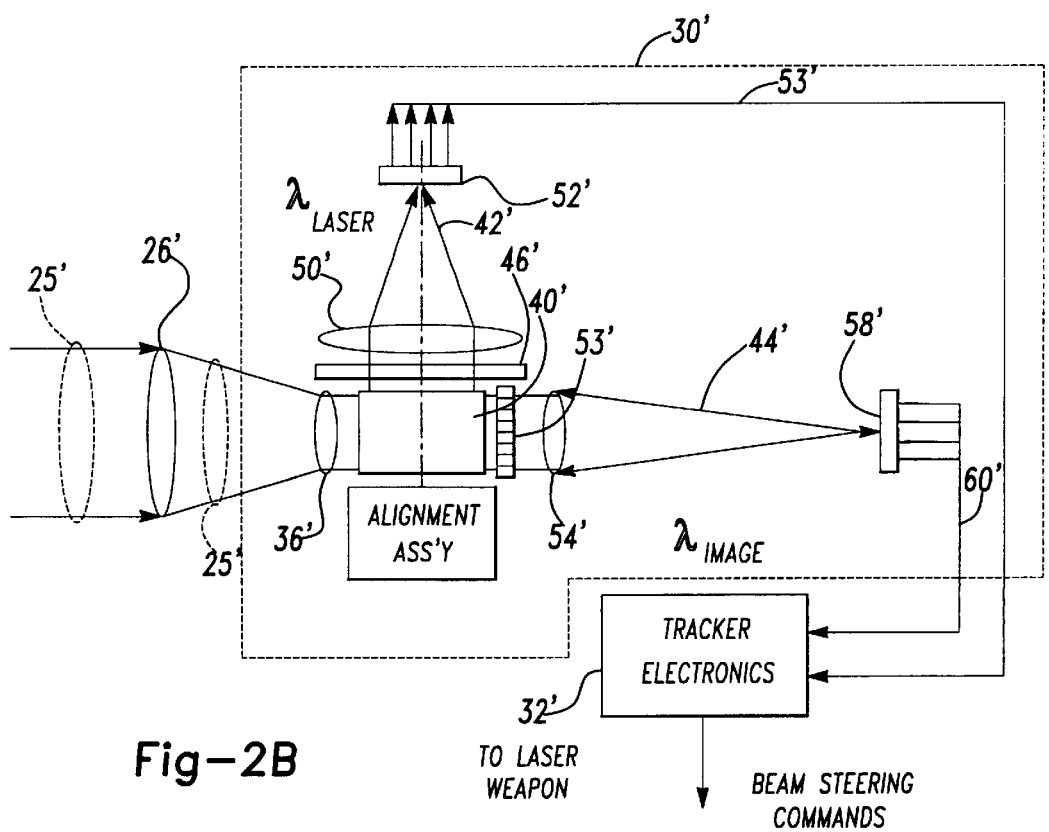
FIG. 2B illustrates the components of the optical subsystem of the second preferred embodiment shown in FIG. 1B in more detail.

Referring to FIG. 1B, a missile tracker according to a second preferred embodiment of the present invention, variant 2, is shown generally at 10'. The tracker 10' includes components that are identical to those in the tracker 10 shown in FIG. 1A, and operates in a manner similar to the tracker 10. However, the tracker 10' does not include an illuminator laser. Rather, as shown in FIG. 2B, the tracker optics subsystem 30' utilizes a blocking filter 53, between the beam splitter 40' and the secondary focusing lens 54' to pass radiation only at the wavelength of the target radiation 23b'. In addition, the detector array 52' is of the type that is tuned to be sensitive only to radiation at the wavelength of the laser radiation. Similarly, the detector array 58' is of the type that is sensitive only to radiation at the image wavelength. Thus, although the target 16' may not be illuminated as brightly as the target 16 shown in FIG. 1A, and thus the target radiation 23b' may not have a luminous intensity like that of the target radiation 23b resulting from radiation 23a being reflected from the target 16, variant 2 eliminates the need for the illuminator laser 22.

Referring to both FIGS. 2A and 2B, an alignment assembly of the type that is commercially available, such as an autocollimator, maintains co-registration of arrays 52 and 58, so that the images may be referenced identically with respect to one another in a common coordinate system. As the individual images are generated, a difference vector between the laser beam hit spot and the desired target aim point can thus be computed with respect to the common coordinate system. Tracker electronics are programmed by conventional programming techniques to drive this vector difference to zero. The laser beam is then servo controlled to the desired target aim point and held there for target engagement purposes.

It should be appreciated that the input optics associated with the tracker of the present invention are designed so that both the target and laser beam image can be captured in the system's field of view and successfully processed by the tracker of the present invention. Thus, the input optics 36 must be reflective or include dichroic refractive elements.

Figure 3:
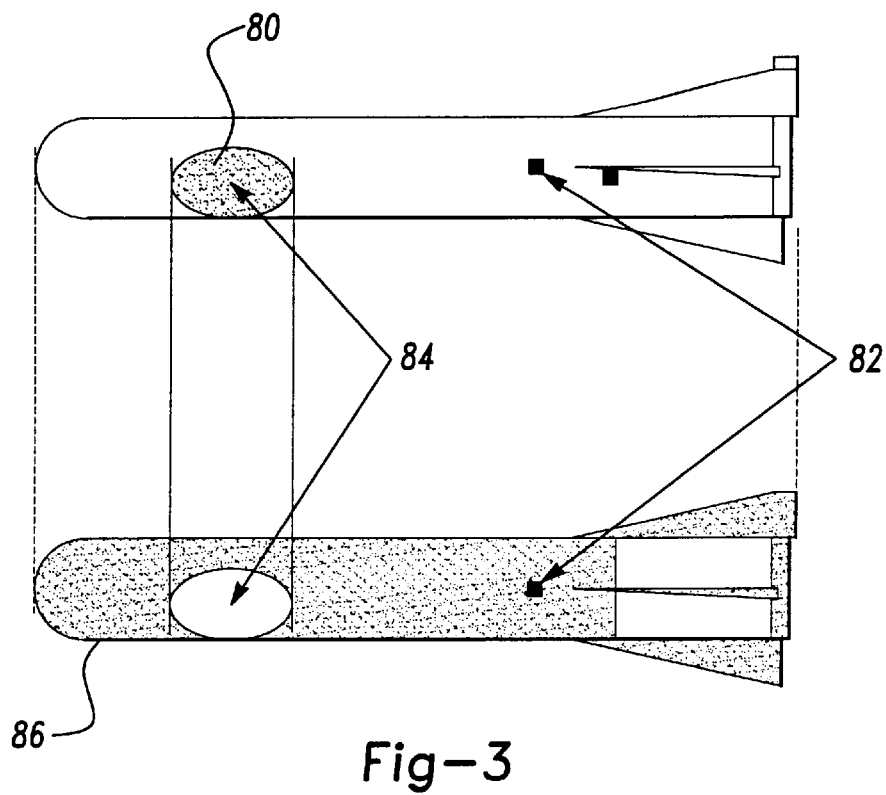
FIGS. 3 and 4 illustrate images detected by the detector arrays of the optical subsystem shown in FIG. 2A–2B.
Figure 4:
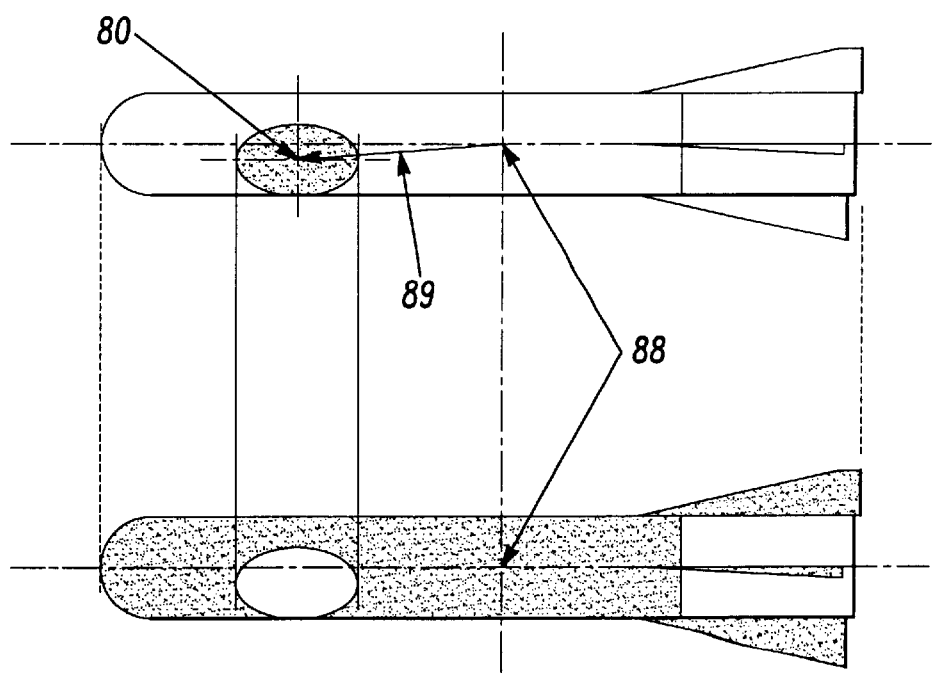

Referring to FIGS. 3 and 4, coregistration of electrical signals generated by the detector arrays 52, 58 for both variant 1 and variant 2, will now be described. As shown in FIG. 3, an image generated by the detector array 52 is shown. The image generated as shown generally at 80, corresponds to the laser beam hit spot formed by laser beam radiation scattered from the missile target body. As shown, the image of the missile itself is at a threshold level below that of the band pass filter 46, and is therefore not imaged by the detector array 52. The filter is preferably as narrow as possible, depending on laser stability, in order to reduce black body energy arising from hot metal of the missile body. Preferably, the narrow band optical filter is centered on the strongest laser line, if the laser has multiple lines.

It should be appreciated that the arrays 52, 58 are aligned by the alignment system such that a given pixel occupies the same relative position in both arrays, as indicated at 82 in FIG. 3. Corresponding positions are also shown relative to the instantaneous laser beam position on the missile target body indicated at 84.

Likewise, in variant 1 the detector array 58 detects the missile image from radiation having a shorter associated wavelength than the radiation forming the laser beam hit spot. In variant 2, laser wavelengths are blocked by the blocking filter. Thus, as shown in FIG. 3, the laser beam hit spot is not imaged by the detector array 58.

Referring to FIG. 4, the reflected laser beam hit spot again is shown at 80. The target aim point is shown at 88. Tracking electronics process the electrical signal outputs from the arrays 52, 58 to determine a displacement vector 89, that represents the spatial difference between the laser beam hit spot 80 and the target aimpoint 88. Because the arrays 52, 58 are coregistered, the displacement vector 89 can be determined to some fraction of detector element size in common with all arrays. The electronic system thus is capable of directing the laser beam to any position on the missile body under closed loop control, with the tracking electronics algorithm always maintaining the laser beam on the missile midline. Thus, the present invention provides the capability of aiming the laser at any point on the missile, under closed loop control, without the need for detecting a glint off the missile body or other requisite target detection means.

Figure 5:
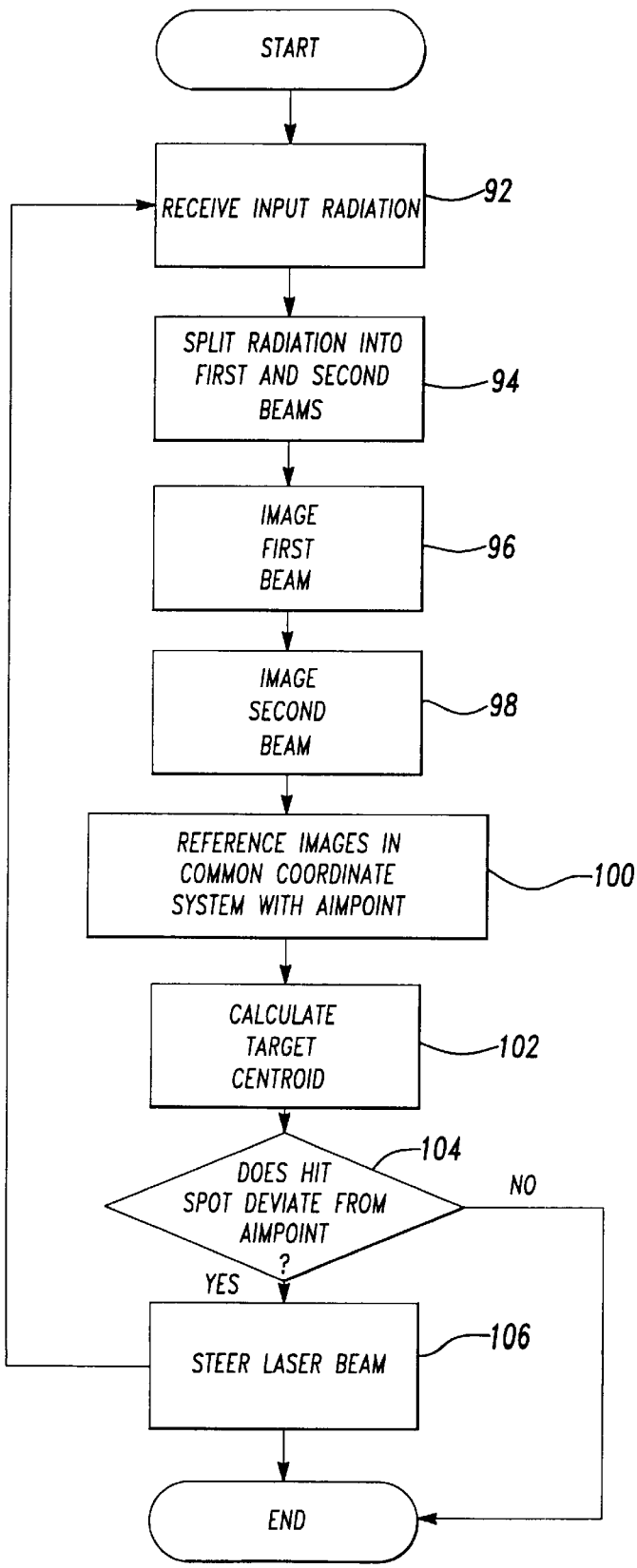
FIG. 5 is a flow diagram illustrating the methodology associated with the operation of the tracker of the present invention.

Referring to FIG. 5, a flow diagram illustrating the methodology associated with the tracker of the present invention is shown at 90. At 92, the tracker receives input radiation. At 94, the tracker beam splitter separates the input radiation into a first beam of laser radiation that is reflected from the missile at the laser beam hit spot, and a second beam of target radiation emanating from the missile body. At 96, the first beam is imaged on the detector array 52, which generates electrical signals corresponding to the detected hit spot. At 98, the second beam is imaged on the detector array 58, which generates electrical signals corresponding to the detected missile body. The co-registration afforded by the alignment assembly ensures that tracking errors due to the separate imaging of the laser hit spot and the missile body are minimized. At 102, the tracker analyzes the imaged hit spot and missile signature through the above-discussed tracking software, and calculates a target certroid. At 104, the tracker determines if the hit spot varies from the desired target aimpoint. If the hit spot does vary from the aimpoint, at 106 the tracker, through its self-referencing servo loop, steers the laser beam to drive the distance between the hit spot and the aimpoint to zero. If the hit spot corresponds to the aimpoint, the methodology ends until the tracker detects a subsequent deviation of the hit spot from the aimpoint.

Upon reading the foregoing description, it should be appreciated that the tracker of the present invention is operative to: (a) acquire and hold a target in its field-of-view and (b) place a laser beam at a desired target location under closed loop control. Thus, the tracker of the present invention now allows the laser weapon to attack a missile or other target at any aspect angle. In addition, the tracker is now insensitive to burning debris and other sources of system distraction, as the tracker images the target at the wavelength of the illumination laser (variant 1) or at the light wavelength passed by the blocking filter (variant 2), and the hit spot at the reflected hit spot radiation wavelength, with all other wavelength being eliminated from consideration. The tracker of the present invention is also a stand alone tracker, and thereby need not work through the same atmospheric tube as the laser beam. The tracker of the present invention is self referencing, and thus measures the instantaneous position of the laser beam relative to the target itself. It is contemplated that the tracker of the present invention could be inexpensively retrofit to present laser weapon tracker.

Various other advantages of the present invention will become apparent to those skilled in the art after having the benefit of studying the foregoing text and drawings, taken in conjunction with the followings claims.

I claim:

1. A target tracker, comprising:
    a weapon that generates a first beam of radiation that engages a target to form a beam hit spot thereon;

a target illuminator that illuminates the target with a second beam of radiation;

an optics sub-system that receives radiation from the beam spot and the target, and separately images the beam hit spot and the target; and a controller that is programmed to steer the first beam of radiation to a desired target aim point in response to information from the imaged beam hit spot and the imaged target.

2. A method of tracking a selected target, comprising the steps of:

selecting an aim point on the target;

illuminating the target with radiation having a first wavelength;

engaging the target with a laser beam of a second wavelength to form a laser beam hit spot thereon;

simultaneously and separately imaging the illuminated target and the laser beam hit spot formed on the target; and steering the laser beam to the aim point on the target based on a calculated distance between the aim point and the laser beam hit spot.

3. The method of claim 2, further comprising the step of coregistering the imaged illuminated target and the imaged laser beam hit spot after the step of imaging both the illuminated target and the laser beam hit spot.

4. A method of tracking a selected target, comprising the steps of:

selecting an aim point on a target;

engaging the target with a laser beam to form a laser beam hit spot thereon;

passing radiation from the target to a first detector array;

passing radiation from the laser beam hit spot to a second detector array;

simultaneously and separately imaging the target and the laser beam hit spot on the first and second detector array, respectively; and steering the laser beam to a selected target aim point based upon a calculated distance between the target aim point and the laser beam hit spot.

5. A target tracker comprising:

a weapon that generates a first beam of radiation that engages a target to form a beam hit spot thereon;

a target illuminator that illuminates the target with a second beam of radiation;

an input that passes radiation from both the beam hit spot and the target;

a beam splitter that splits the radiation from the beam hit spot and the radiation from the target;

first and second detectors that image the beam hit spot and the target, respectively, and that generate electrical signals corresponding thereto; and a controller that is programmed to steer the first beam of radiation to a desired target aim point in response to information from the imaged beam hit spot and the imaged target.

6. The target tracker of claim 5, further comprising a recollimating lens in optical communication with both the input and the beam splitter that focuses the incoming radiation onto the beam splitter.

7. The target tracker of claim 5, further comprising an imaging lens optically located between the beam splitter and the first detector that images the separated first beam of radiation onto the first detector.

8. The target tracker of claim 7, further comprising a narrow band filter in optical communication with the radiation from the beam hit spot, the narrow band filter being located between the imaging lens and the beam splitter to pass radiation only at a wavelength of the radiation from the hit spot.

9. The target tracker of claim 5, wherein the beam splitter comprises a dichroic beam splitter.

10. The system of claim 5, further comprising an alignment assembly in operative communication with the optics sub-system that ensures co-registration of the electrical signals from the first and second detectors.

11. The target tracker of claim 5, further comprising a secondary imaging lens, in operative communication with the radiation from the target, between the beam splitter and the second detector that magnifies the radiation from the target and projects a second beam of radiation from the target onto the second detector.

* * * * *